3,035,868
METHOD OF AND APPARATUS FOR THE CONVEYING OF POWDERED OR PULVERULENT DRY MATERIAL IN BULK
Robert W. Allen, Disley, England, assignor to Henry Simon Limited, Cheadle Heath, Stockport, Cheshire, England, a company of Great Britain
Filed Aug. 15, 1960, Ser. No. 49,744
2 Claims. (Cl. 302—29)

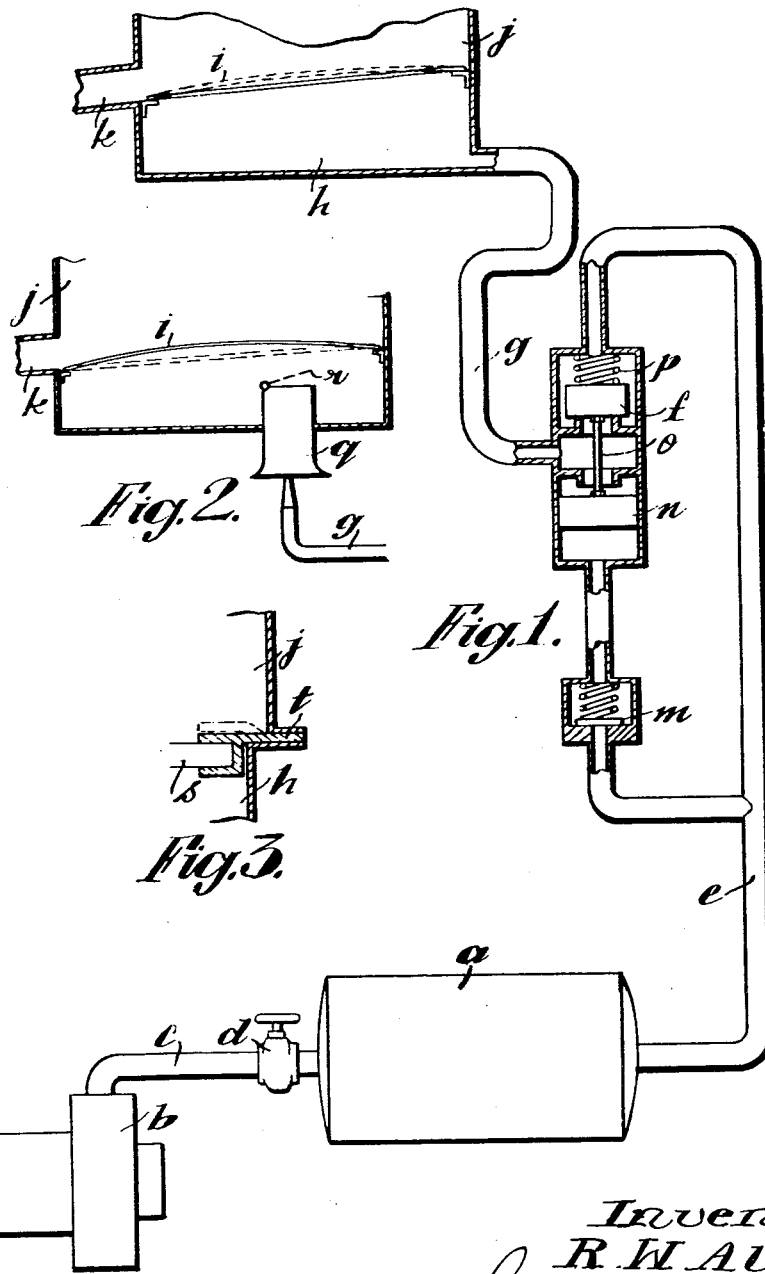

This invention relates to means for transporting pulverulent dry materials on conveyors of a type wherein the materials to be transported are supported on an inclined uniformly porous surface through which a gas (usually air and hereinafter referred to as air) is passed into the materials to aerate them and produce therein fluid characteristics which cause them to flow by gravity down the inclined porous surface, whose angle of inclination is slightly greater than the angle of repose of the aerated materials.

In such arrangements, it is usual to provide that the uniformly porous medium forming the inclined surface has a relatively high resistance to the fluidising air which passes through it from a pressure chamber, so that the flow of air through the medium is substantially uniform in pressure and volume over the whole of the surface area served by the said pressure chamber, and it is also usual for the air in the pressure chamber to be maintained at a predetermined substantially constant static pressure in the range between 2″ W.G. and 4 lbs. per square inch, the permeability of the porous medium being such that at the predetermined pressure it will pass from 5 to 15 cu. ft. of air per minute for each square foot of porous surface area.

The object of this invention is to provide improved transporting means of the type specified which are more efficient and more economical than existing means.

According to the present invention, conveying means of the type specified for the transporting of pulverulent dry materials comprises between the source of compressed air and the chamber beneath the inclined porous material to which the compressed air is supplied, an air-flow interrupting means arranged so that it will automatically interrupt the flow of air for periods and at intervals which can be preset to provide that the fluidising air is fed into the chamber in the form of a low-frequency series of pulses, the intervals between which are of equal or longer duration than the duration of the said pulses, and the porous supporting material is arranged so that it rises and falls due to the intermittent pressure pulses in a cyclic manner by an amount sufficient to agitate the material supported thereon so that its fluidisation is accelerated.

The porous supporting material may, for example, be a pliable medium, such as rubberised felting, porous plastic or the like which is firmly anchored at its extremities to the upper edges of the walls of the pressure chamber, or it may be a rigid medium such as porous ceramic tiling, sintered metal, polymerised resin-impregnated and compressed vegetable fibres or the like which is flexibly supported at its extremities from the upper edges of the walls of the pressure chamber, such flexible supports allowing the porous material to rise and fall in a cyclic manner.

Referring to the accompanying explanatory drawings:

FIGURE 1 is a general view of one form of apparatus in accordance with this invention for producing pressure pulses at the porous material over which the dry pulverulent material travels and for enabling the said porous material to rise and fall due to said pressure pulses.

FIGURE 2 shows a modified arrangement for admitting the pressure pulses to the porous material.

FIGURE 3 shows a further modification in which the porous material is rigid but is carried in a flexible frame which allows the material to rise and fall due to the pressure pulses.

Figure 4:
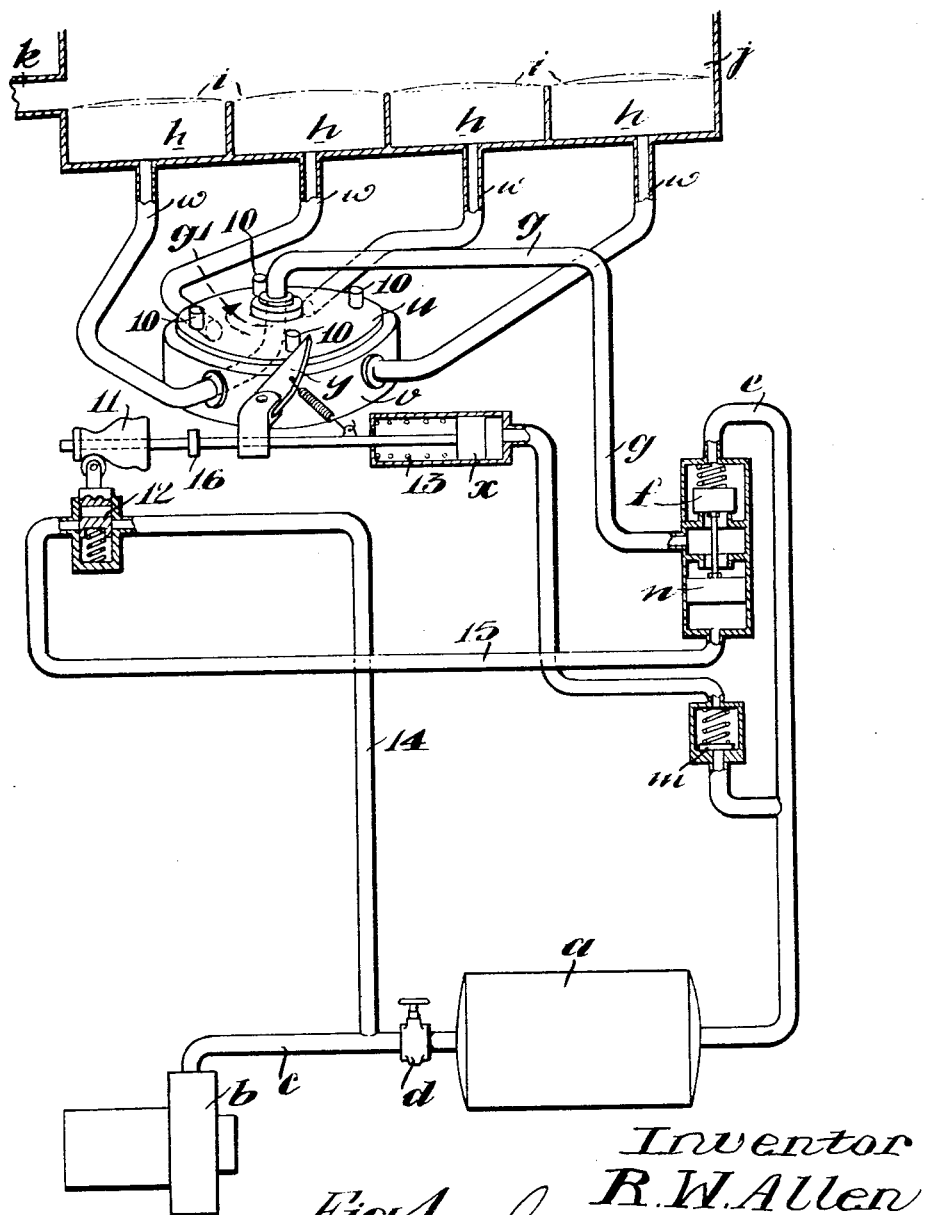
FIGURE 4 is a general view of an arrangement for pulsating a plurality of porous materials in sequence, the dry pulverulent material passing progressively over the said materials.

In FIGURE 1, $a$ indicates an air storage reservoir connected with a compressor or a source $b$ of compressed air (which is preferably at a comparatively high pressure) by a pipe $c$ incorporating an air-flow-rate restricting valve $d$ which enables the growth of pressure in the reservoir $a$ to be regulated as desired. Associated with the delivery pipe $e$ from said reservoir is a spring loaded valve which is normally closed so as to prevent the flow of compressed air to the pipe $g$ and so to the chamber $h$ and the underside of the inclined flexible diaphragm $i$ which is composed of porous material so that the compressed air can flow therethrough to fluidise the dry pulverulent material admitted to the container $j$ and cause it to travel freely to the outlet $k$. The compressed air from the reservoir also flows to a spring loaded pressure sensitive valve $m$ which is adjustably pre-set to open when the pressure in the reservoir reaches a predetermined amount and which when open allows compressed air to pass to the underside of the piston $n$ connected by the rod $o$ to the valve $f$. The piston $n$ is of larger diameter than the valve $f$, so that when the compressed air is admitted to its cylinder by the valve $m$, the valve $f$ is pushed off its seat and compressed air passes to the underside of the porous material $i$. This results in a rapid fall in the air pressure in the reservoir $a$, as the valve $d$ permits only a relatively slow rate of replacement of the compressed air in the reservoir. The spring $p$ then forces the valve $f$ on to its seat and depresses the piston $n$. The air pressure beneath the diaphragm $i$ then falls rapidly and is not re-created until the pressure in the reservoir has built up sufficiently to cause the valve $m$ to pass air to the piston $n$ to open the valve $f$.

The combination of the pressure pulses acting through the porous diaphragm on the pulverulent material on the latter and the rising and falling movement of the porous diaphragm provide a very effective means for fluidising the pulverulent material and causing it to flow freely.

In the FIGURE 2 arrangement, the pipe $g$ through which compressed air is delivered from the valve $f$, FIGURE 1, to the pressure space $h$ beneath the porous diaphragm $i$, projects its air into a nozzle $q$ open to the atmosphere at its lower end so that atmospheric air is drawn into the nozzle and flows with the compressed air into the pressure chamber or space $h$ beneath the porous diaphragm $i$. A flap valve $r$ on the top of the nozzle $q$ ensures that the air pressure in the space $h$ is only dissipated through the diaphragm and not to atmosphere. This ensures that a greater quantity of air is delivered to the pressure chamber $h$ than is supplied by the reservoir $a$.

In the arrangement shown in FIGURE 3, the porous material $s$ consists of a rigid member held between the pressure chamber or space $h$ and the container $j$ for pulverulent material by a flexible frame $t$ which permits the member to rise and fall due to pressure pulses.

In the FIGURE 4 arrangement, the delivery pipe $g$ from the valve $f$ leads to a rotor $u$ within a fixed casing $v$ having connections $w$ to several pressure chambers or spaces $h$ each with a porous diaphragm $i$ thereon. The rotor is revolved by suitable means as hereinafter described to place its branch pipe $g^1$ into communication successively with the pipes $w$ leading to the pressure chambers $h$ beneath the several diaphragms $i$.

When the pressure in the reservoir $a$ reaches a predetermined amount and the valve $m$ is opened, pressure passes to the cylinder containing the piston $x$ and moves the latter to cause the pawl $y$ carried from the piston rod $z$ to engage one of the projecting pegs 10 on the valve rotor $u$ and turn such rotor through a circular distance equal to the spacing between the pipe connections $w$ to the valve casing $v$. The piston rod $z$ also carries a cam 11 operated by a collar 16 on the rod which after the rod has operated the pawl to turn the rotor $u$, opens a valve 12 and allows compressed air to pass from the compressed air source $a$ to the underside of the piston $n$ which then moves to open the valve $f$. When the pressure in the reservoir $a$ falls due to the compressed air flow to the pipe $g$ and so to one of the pressure chambers $h$, the piston $x$ is returned by its spring 13 to its initial position which results in the closing of the valve 12 by its spring and the return of the pawl $y$ to its original position ready to operate the next peg 10 on the rotary valve $u$. The pawl $y$ turns freely about its pivot when it is moving back to its original position after operating the rotor $u$. In the FIGURE 4 arrangement, the full air pressure is passed from the pipe 14 to a pipe 15 leading to the underside of the piston $n$ each time the cam 11 is moved after the piston rod $z$ has caused the pawl $y$ to turn the rotor $u$ but such pressure is cut off when the piston $x$ returns to its initial position. There is therefore a relatively short high pressure pulse each time the valve $f$ is opened to pass such high pressure air to one of the pipes $w$. The lost motion between the collar 16 and cam 11 ensures that the latter is not operated until after the pawl $y$ has turned the rotor $u$.

The simultaneous aeration and mechanical agitation of the material arising from the periodic interruption of the flow of aerating air causes the said material to attain and retain fluid characteristics with a smaller quantity of admixed air than is possible with a constant pressure constant volume air supply, and consequently for any chosen transporting capacity, an equipment according to this invention will operate in conjunction with a compressed air source of less volumetric capacity and with less power consumption than is possible by hitherto known means.

What is claimed is:

1. Apparatus for the fluidization of dry pulverulent material to facilitate its conveyance or transportation comprising an inclined porous medium over which the dry pulverulent material travels and through which pressure air for fluidizing the material flows, means delivering pressure air to the underside of said porous medium to raise the same, a reservoir for pressure air, means for charging said reservoir at a reduced rate, means operable when the pressure in said reservoir reaches a predetermined high value to cause said high pressure air to pass to the underside of said porous medium, said means being also operable when the pressure in said reservoir falls below a predetermined low value to cut off the air supply to the said porous medium which then returns to its normal low level so that pressure changes at the latter are automatically and cyclically produced.

2. Apparatus as claimed in claim 1 in which a plurality of porous flexible surfaces over which the material passes in sequence receive the air pressure changes in sequence.

References Cited in the file of this patent
UNITED STATES PATENTS

| | | |
|---|---|---|
| 1,759,983 | Houston | May 27, 1930 |
| 2,220,193 | Ahlmann | Nov. 5, 1940 |

FOREIGN PATENTS

| | | |
|---|---|---|
| 689,191 | France | May 26, 1930 |
| 712,593 | Great Britain | Dec. 5, 1952 |